April 20, 1943.  W. A. DOBSON  2,317,183
TYPEWRITING MACHINE
Filed Dec. 10, 1940
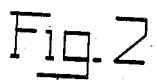
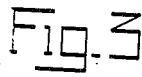
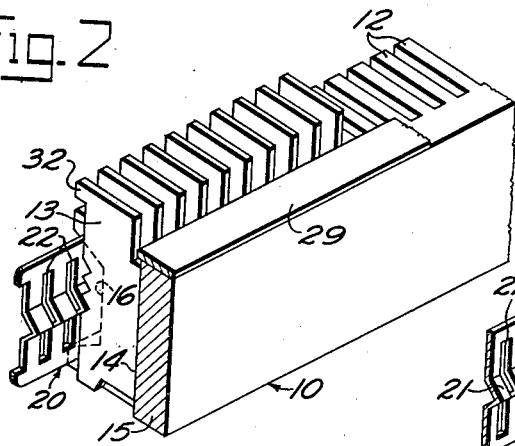
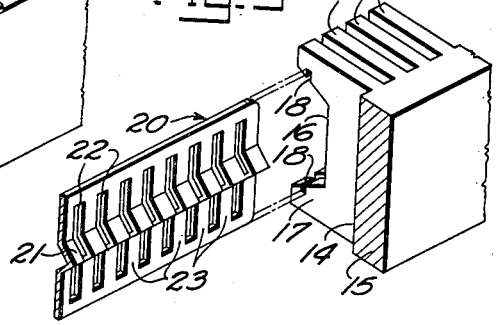
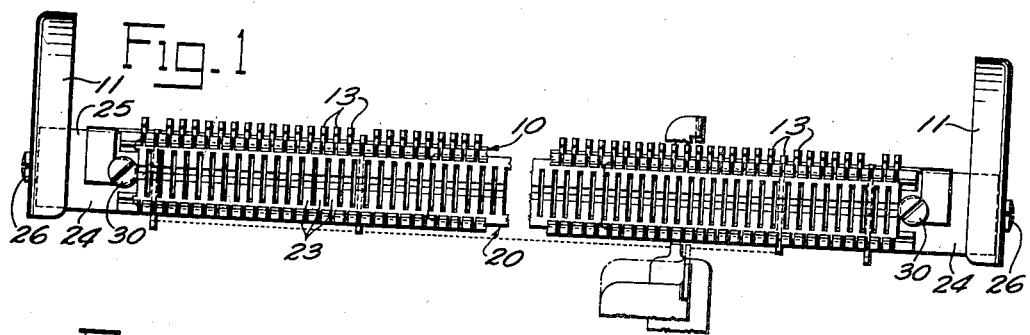
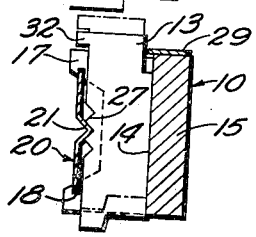
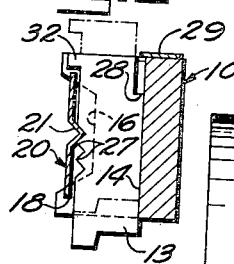
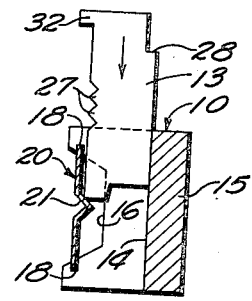
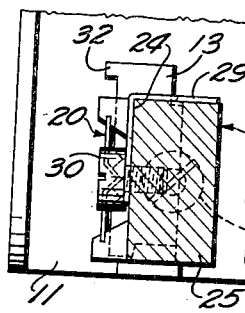
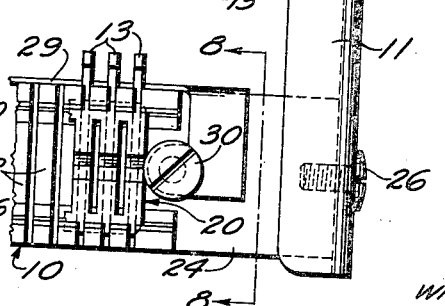
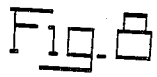
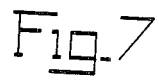
INVENTOR
WILLIAM A. DOBSON
BY
ATTORNEY Patented Apr. 20, 1943

2,317,183

UNITED STATES PATENT OFFICE 2,317,183

TYPEWRITING MACHINE

William A. Dobson, Wethersfield, Conn., assignor to Underwood Elliott Fisher Company, New York, N. Y., a corporation of Delaware Application December 10, 1940, Serial No. 369,467

1 Claim. (Cl. 197—70)

This invention relates to key-set margin and tabulator stop mechanisms for typewriting machines, and more particularly to the stop rack organization therefor.

One of the objects of the invention is to provide an improved carriage stop and rack organization of simple and rugged construction, adapted for economic fabrication and quick assembly of the component parts.

Another object is to provide an improved stop-detenting device in a stop rack organization, which renders the stops and the cooperating detent both capable of economic construction by affording a yieldable, unitary detent member common to a large number of the stops on the rack, and by eliminating the yieldable detent member usually required on each of the stops.

Other objects and advantages will be hereinafter apparent.

In the drawing:

Figure 1 is an elevational view of a margin and tabulator mechanism of a typewriter, embodying the improved stop rack organization of the invention, Figure 2 is an enlarged fragmentary perspective view of the assembled stop rack, Figure 3 is a perspective view of the rack bar and detent member, showing the manner of assembling these elements, Figures 4, 5 and 6 are each transverse sectional views of the stop rack showing the settable stop during assembly in Figure 4, and in two carriage-stop positions in Figures 5 and 6, Figure 7 is an enlarged elevational view of an end portion of the stop rack in position on the typewriter carriage, and Figure 8 is a transverse section taken on line 8—8 of Figure 7.

The stop rack organization of the invention may be embodied in a conventional margin stop and/or tabulator stop mechanism in which a series of key-settable stops are arranged at letter-space intervals along a supporting rack mounted on the carriage to travel therewith. Each stop is slidable in the rack and may be individually set to a position to cooperate with counterstop means, by operating a stop setter arranged to reciprocate transversely relative to the stop and adapted to engage a particular stop aligned therewith, according to the position of the carriage in its line-typing run. A conventional key-operated stop-restorer may also be provided which, when actuated, engages a set stop aligned therewith to restore same to ineffective position. Detent means is usually provided to yieldably hold the stop either in ineffective or counterstop-engaging positions.

The stop rack organization of the invention includes a rack bar 10 suitably mounted on the typewriter carriage, as by fastening the rack bar at each end to end members 11 of the carriage. The bar 10 may be a single length of bar stock, generally rectangular in cross section and slotted transversely at letter-space intervals to form a series of partitions or comb teeth 12 between adjacent ones of which plate-like stops are slidably retained. The slots defining the comb teeth 12 are each of a width to slidably accommodate the stop 13 without looseness, and extend transversely into the bar from one longitudinal face thereof, the comb teeth fronting at said face. These slots each terminate at 14 intermediate the width of the bar to thereby leave a solid section 15 continuous throughout the length of the bar, giving same the required rigidity against lateral deflection.

The side of the bar 10 at which the comb teeth front is grooved longitudinally as indicated at 16 so that, in cross section, each comb tooth 12 presents a U shape having a projecting part 17 at each end thereof. The bar 10 may, in view of the provision of the longitudinal groove 16, be considered as generally of channel or U form in cross section, in which form the parts 17 bordering the groove 16 form the channel flanges and the portion 15 forms the intermediate or connecting member of the channel. In this construction, the transverse slots divide the channel flanges 17 and a portion of the intermediate channel member 15 into the series of comb teeth 12.

At the inner, confronting face of each tooth part 17, a notch 18 is provided. These notches at each side of the groove 16 are in alignment with each other and thereby form a continuous slot running longitudinally of the rack bar 10, these slots being directly opposite each other.

The slots 18 are adapted to receive a plate-like detent member 20 formed of a one-piece strip of flat spring metal. This metal strip is bent along longitudinal lines intermediate its width to provide an offset portion or bead 21, preferably of V form. The strip 20 is slotted transversely at letter-space intervals, as indicated at 22, to form a series of aligned individual detent springs 23. The slots 22 are closed at each end, being cut out across the strip, only at an intermediate longitudinal area, and the individual detent springs 23 are thus interconnected at their corresponding ends by the continuous borders of the metal strip.

At each end of the rack bar 10, the bar side at which the groove 16 is disposed, is recessed at 24, see Figures 7 and 8. Omission of the transverse comb tooth slots at each bar end, leaves a solid block 25 into which screws 26 may be threaded for fastening the rack bar 10 to the typewriter carriage. The recesses 24 provide clearance at each end of the slots 18 so that the detent member 20 may be inserted endwise into position between the tooth parts 17 with the longitudinal edges of member 20 engaged in the slots 18.

In the embodiment of the invention illustrated, the stops 13 may serve individually as margin stops or tabulating stops, according to the extent to which any stop is projected from its normally ineffective position on the bar, shown in Figure 2. When the stop is projected as shown in Figure 5, its lower end is adapted to engage a margin counterstop for determining the typed line length, and when projected as shown in Figure 6, the stop serves as a column or tabulator stop in cooperation with a tabulator counterstop provided. These features of the stop rack organization, in cooperative association with the mentioned counterstops, form the subject matter of my copending application Serial No. 372,622, filed December 31, 1940. Insofar as the present invention is concerned, it will suffice to note that the stops 13 are selectively settable from a normally ineffective position to one or more projected positions for engagement with counterstop means provided. Each stop 13 is provided with a series of detent projections 27 preferably formed by a group of V notches in one edge of the stop adjacent the detent member 20. As the stop 13 is urged from one position to another, the inclined sides of the detents 27 force the associated spring 23 to flex outwardly until the stop is moved a sufficient degree to permit the detent bead 21 to snap into a succeeding notch. It will be noted that the detent springs 23 are each initially tensioned so as to urge the bead 21 firmly into one of the notches in any selected position of the stop. This tensioning of the detent springs hold the stops firmly against the bottom 14 of the transverse slots in the bar, so that the stops are all maintained in constant alignment.

To forestall unintentional removal of the stops from the rack bar 10, each stop is formed to provide a shoulder 28 adapted to engage a rigid strap 29 secured to a longitudinal edge of the rack bar in position to extend over all the transverse notches in said rack bar to thus overlie the shoulder 28 of each stop. As shown more clearly in Figures 7 and 8, each end of the strap 29 is bent laterally to lie against the face of each recess 24 and is secured thereto by a screw 30 passing through an aperture in the strap end and threaded into each block 25. It will be noted that the screw 30, at each end of the rack bar, is so positioned as to abut the detent member 20 and thus maintains said member in fixed endwise position in the slots 18. It will also be noted that, by removal of the two screws 30, both the strap 29 and detent member 20 are removable, so that the component parts of the rack bar organization may be quickly disassembled. This feature, of course, also expedites the assembly operation.

The strap 29 prevents removal of the stops in one direction, and a prong 32 on each stop prevents its removal in the opposite direction by the engagement of said prong with an edge of the detent member 20, as will be apparent in Figure 5. In assembling the stop rack, the detent member 20 is inserted into position in the rack with the detent springs 23 each opposite a transverse slot. The stops 13 are then each inserted into its slot, as shown in Figure 4, applying enough force to the stop to flex the detent spring outwardly. With all the stops in position, the strap 29 is secured in place by installing the screws 30 which also lock the detent member 20 in place.

Although in this application, there is specifically described one embodiment which the invention may assume in practice, it will be understood that same is shown for the purposes of illustration, and that the invention may be modified and embodied in various other forms without departing from its spirit or the scope of the appended claim.

What is claimed is:

In a typewriter carriage stop mechanism, a rack bar of channel form having the flanges thereof transversely slotted to present matching rows of comb teeth for slidably mounting a plurality of stops, each flange having a groove disposed longitudinally of the bar, an elongate resilient stop-detenting strip straddling the bar channel with its longitudinal edges retained in the flange grooves, the flange grooves being open at at least one end of the bar to facilitate assembly, and means at said bar end for releasably obstructing endwise withdrawal of the detenting strip.

WILLIAM A. DOBSON.